US011820907B2

(12) United States Patent
Huang et al.

(10) Patent No.: US 11,820,907 B2
(45) Date of Patent: Nov. 21, 2023

(54) TIRE DRESSING COMPOSITION AND METHODS OF MAKING THEREOF

(71) Applicant: Illinois Tool Works Inc., Glenview, IL (US)

(72) Inventors: Tsao-Chin Clarence Huang, Glenview, IL (US); Ali Alwattari, Glenview, IL (US)

(73) Assignee: ILLINOIS TOOL WORKS INC., Glenview, IL (US)

( * ) Notice: Subject to any disclaimer, the term of this patent is extended or adjusted under 35 U.S.C. 154(b) by 611 days.

(21) Appl. No.: 16/663,811

(22) Filed: Oct. 25, 2019

(65) Prior Publication Data

US 2020/0131395 A1 Apr. 30, 2020

Related U.S. Application Data

(60) Provisional application No. 62/751,961, filed on Oct. 29, 2018.

(51) Int. Cl.
*C09D 123/20* (2006.01)
*C09D 7/20* (2018.01)
*C09D 7/45* (2018.01)

(52) U.S. Cl.
CPC ............. *C09D 123/20* (2013.01); *C09D 7/20* (2018.01); *C09D 7/45* (2018.01)

(58) Field of Classification Search
CPC . C09D 7/45; C09D 7/20; C09D 5/024; C09D 123/20; C08L 23/20; C08L 23/22; C08L 83/04; C08L 2201/54; C08L 2201/56; C08K 5/01
See application file for complete search history.

(56) References Cited

U.S. PATENT DOCUMENTS

| | | | |
|---|---|---|---|
| 3,223,134 A * | 12/1965 | Hofmann | ................. B60C 9/06 152/209.5 |
| 3,338,855 A | 8/1967 | Kray | |
| 4,810,407 A | 3/1989 | Sandvick | |
| 5,507,960 A | 4/1996 | Popa et al. | |
| 2004/0131787 A1 | 7/2004 | Fang | |
| 2004/0171744 A1 | 9/2004 | Huang et al. | |
| 2007/0010607 A1 | 1/2007 | Smith et al. | |
| 2013/0115377 A1 | 5/2013 | Huang | |
| 2013/0209674 A1 | 8/2013 | Huang | |
| 2014/0113079 A1 | 4/2014 | Huang | |

FOREIGN PATENT DOCUMENTS

| | | |
|---|---|---|
| CN | 101023145 A | 8/2007 |
| CN | 107163769 A | 9/2017 |
| EP | 0839876 A1 | 5/1998 |
| GB | 1066421 A | 4/1967 |
| WO | 1998056598 A1 | 12/1998 |

OTHER PUBLICATIONS

Int'l. Search Report for PCT/US2019/058346, dated Feb. 21, 2020.
First Office Action issued in corresponding Chinese Patent Appln. No. 201980070522.X, dated Oct. 20, 2022.

* cited by examiner

*Primary Examiner* — Vishal V Vasisth
(74) *Attorney, Agent, or Firm* — MaxGoLaw PLLC

(57) ABSTRACT

A tire dressing composition is provided that includes petroleum distillates in which a polybutene or isobutene/butene copolymer is dissolved to form a clear solution. In the water-based approach, the polybutene or isobutene/butene copolymer was emulsified by a surfactant. A wetting agent is also present in the composition to render the composition self-levelling. The sprayable tire dressing composition provides a high gloss and good wettability to a tire surface that develops a uniform coating on the treated tire surface.

16 Claims, No Drawings

TIRE DRESSING COMPOSITION AND METHODS OF MAKING THEREOF

RELATED APPLICATIONS

This application claims priority benefit of U.S. Provisional Application Ser. 62/751,961 filed 29 Oct. 2018, the contents of which are hereby incorporated by reference.

FIELD OF THE INVENTION

The present invention in general relates to a tire dressing composition and the use thereof and in particular, to such a thickened composition amenable to application to the tires of various vehicles to provide a durable, low-tack, high gloss protective coating.

BACKGROUND OF THE INVENTION

As the wear and environmental exposure increases on a tire, the sidewall rubber surfaces often become dull and unattractive. This is due to various causes including wind, weather, sunlight, scratching, abrasion from dirt, and other chemical and physical reactions. Many products are available today on the market for tire dressing usage to address these adverse effects. Many of these tire dressing products restore an older appearance from a dull, weathered appearance to a shiny, bright, and like-new condition.

A typical tire dressing composition is a blend of shine components and a hydrocarbon solvent or a conventional oil in water emulsion system based on the shine components to deliver a high gloss coating. The most important design and performance characteristics observed in optimized sprayable common tire dressing compositions are high gloss and wettability on tires which develop a uniform coating on the treated tire surface with high gloss on treated tires.

For example, conventionally a dispersion of the silicone fluids in petroleum distillates or a conventional oil in water silicone emulsion system with milky or opaque appearance are often used to restore the attractive, bright, shiny, and like-new appearance on the tire surface. Typically, conventional tire dressing formulas for dressing and appearance applications tend to have limited adhesion to the rubber of the tire. Ideally, a product has the long-term performance characteristics of being resistant to car wash detergents and weathering, such as rain and storm. Unfortunately, conventional products remain difficult for a consumer to apply and do not provide the balance of desired properties. To-date, tire dressing products have involved a trade-off of properties with low viscosity film forming polymers tending to be vulnerable to weathering, sag, and tack during drying; while higher molecular weight film forming polymers tend to be brittle and delaminate.

Thus, there exists a need for a tire dressing composition that is sufficient consistency to be applied to tire surfaces and has durability against weather and detergent. There also exists a need for a process to apply such a composition to provide a high gloss protective dressing coating to a tire surface.

SUMMARY OF THE INVENTION

A tire dressing composition is provided that includes, but not limited to, petroleum distillates in which a polybutene or isobutene/butene copolymer is dissolved or suspended. A wetting agent is also present in that composition to render the composition self-levelling. The sprayable tire dressing composition provides a high gloss and good wettability to a tire surface that develops a uniform coating on the treated tire surface. In addition, by a different approach, the polybutene or isobutene/butene copolymer is emulsified in water to produce an oil-in-water (polybutene or isobutene/butene copolymer-in-water) emulsion, or a water-in-oil (water-in-polybutene or isobutene/butene copolymer) emulsion, or a microemulsion, using a variety of anionic, cationic and non-ionic surfactants. The sprayable water-based tire dressing composition provides a high gloss and good wettability to a tire surface that develops a uniform coating on the treated tire surface.

By conducting both approaches, the resulting coatings on surfaces of tires have the shine up to 230 gloss units. The shine remaining greater than 110 gloss units up to four weeks after being dried on the surface.

DETAILED DESCRIPTION OF THE PREFERRED EMBODIMENTS

The present invention has utility as a sprayable tire dressing composition that has high gloss and good wettability to a tire surface that develops a uniform coating on the treated tire surface. In embodiments of the inventive tire dressing, performance characteristics such as high gloss, good wettability, no streaking, and low sling performance are surprisingly achieved by using a polybutene or isobutene/butene copolymer. A hydrocarbon solvent with good compatibility with the polybutene or isobutene/butene copolymer acts as a volatile carrier for the polybutene or isobutene/butene copolymer in some embodiments of the present formula. A wetting agent, such as a perfluoroalkyl- or polyfluoroalkyl-containing compound is present in the composition to promote wetting, reduce surface tension, enhance leveling, and film forming characteristics on tire surfaces. The inventive composition is formulated so as to be self-levelling on the tire surface to ensure a smooth and uniform coating on the tire surface with an initial shine of up to 230 gloss units. In some inventive embodiments, a defoamer compatible with the remainder of the composition is provided and selected to retain transparency of the clear and colorless liquid inventive composition as viewed with an unaided, normal human eye. A fragrance or other ancillary additives is present in some inventive compositions.

In the water-based approach, a variety of anionic, cationic and non-ionic surfactants or stabilizing agents were used to emulsify polybutene or isobutene/butene copolymer in water to form the oil-in-water emulsion or microemulsion, or to form the water-in-oil emulsion. A wetting agent, such as an amphoteric polyfluoroalkyl betaine surfactant is present in the composition to promote wetting, reduce surface tension, enhance leveling, and film forming characteristics on tire surfaces. The inventive composition is formulated so as to be self-levelling on the tire surface to ensure a smooth and uniform coating on the tire surface with an initial shine up to 230 gloss units. In some inventive embodiments, a defoamer compatible with the remainder of the composition is provided and selected to retain the clear or translucent, or opaque liquid inventive composition as viewed with an unaided, normal human eye. A fragrance or other ancillary additives is present in some inventive compositions.

It is to be understood that in instances where a range of values are provided, for example with respect to a weight percentage range of a composition component, that the range is intended to encompass not only the end point values of the range but also intermediate values of the range as explicitly being included within the range and varying by the last significant figure of the numeral. By way of example, a recited range of from 1 to 4 is intended to include 1-2, 1-3, 2-4, 3-4, and 1-4.

As used herein, butene is intended to refer to both n-butene and isobutene.

Forms of the polybutene or isobutene/butene copolymer operative in embodiments of the inventive composition for a sprayable tire dressing include:

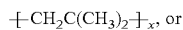, or

, or

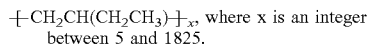, where x is an integer between 5 and 1825.

The currently commercially available polybutene or isobutene/butene copolymer has a number average molecular weight between 180 and 10,000 and that polybutene or isobutene/butene copolymer having a viscosity of 3 to 45,000 centiStokes. It is appreciated that the repeat units of the polybutene or isobutene/butene copolymer are readily modified with terminal, pendant, or both positions of moieties. Moieties operative herein illustratively including $C_1$-$C_{12}$ fluoroalkyl, $C_1$-$C_{12}$ perfluoroalkyl, $C_6$ fluorophenyl, and combinations thereof. Such modified polybutene or isobutene/butene copolymers are readily formed using monomers modified to include the additional moiety or are added by creating unsaturations in the polybutene or isobutene/butene copolymer that are then reacted with moiety precursors. It is appreciated that by inclusion of sufficient fluorine content into polybutene or isobutene/butene copolymer, that the need for a separate wetting agent is reduced or even eliminated.

An inventive tire dressing composition in some embodiments includes a wetting agent in an amount present to impart a high gloss to a tire surface dress coating so produced by the inventive composition. Wetting agents operative herein illustratively is a non-ionic polymeric fluorochemical surfactant, a fluoroaliphatic polymeric ester in a hydrocarbon solution, a polyfluoroalkyl betaine amphoteric surfactant, nonionic polymeric fluorinated surfactants, anionic phosphonated fluorinated surfactants, nonionic ethoxylated fluorinated surfactants, or a combination thereof. Typically, the wetting agent is present from 0.05 to 4 total percent, while in some other embodiments is present from 0.1 to 0.7 total weight percent.

In the water-based approach, wetting agents operative herein illustratively is an amphoteric polyfluoroalkyl betain surfactant, nonionic polymeric fluorinated surfactants, anionic phosphonated fluorinated surfactants, nonionic ethoxylated fluorinated surfactants, or a combination thereof. Typically, the wetting agent is present from 0.05 to 4 total percent, while in some other embodiments is present from 0.1 to 0.7 total weight percent.

An inventive tire dressing composition in some embodiments includes a defoaming agent in an amount present to inhibit blister formation in a tire surface dress coating so produced by the inventive composition. Defoamer agents operative herein illustratively include silicone based defoamers, mineral oil based defoamers, and mixtures of foam destroying polymers and hydrophobic solids such as polyureas, as are known to the art. Specific exemplary silicone based defoamers illustratively include silica-filled polydimethylsiloxane and polyether-modified polysiloxanes. While the optimal amount of a given defoamer depends on a variety of factors that include viscosities and surface tension of other components, a defoamer, if present, is included in amounts of up to 5 total weight percent and in other embodiments from 0.05 to 1 total percent.

Inventive water-based tire dressing composition include in some embodiments a surfactant present in an amount to emulsify the polybutene or isobutene/butene copolymer of the inventive tire dressing composition to an extent such that the composition is able to form a stable oil-in-water emulsion, or water-in-oil emulsion, or microemulsion. Surfactants operative herein illustratively include nonionic ethoxylated fluorinated surfactants, polyether modified polydimethylsiloxane, polyether modified polymethylalkylsiloxane, aralkyl modified polymethylalkylsiloxane, polyester modified hydroxyl functional polydimethylsiloxane, acryl functional polyester modified polydimethylsiloxane, polyether polyester modified hydroxyl functional polydimethylsiloxane, solution of polyacrylate, solution of a fluoro modified polyacrylate, polymeric fluorinated, ethoxylated alcohol, ethoxylated fatty acid, sorbitan ester, ethoxylated castor oils, alkyl polysaccharides, sorbitan monostearate, sorbitan monolaurate, sorbitan oleate, polyoxyethylene sorbitan, polyoxyethylene sorbitan fatty acid ester, polyoxyethylene sorbitan monooleate surfactants; or anionic phosphonated fluorinated, phosphate ester, aliphatic phosphate ester; or cationic ethoxylated fatty ammonium ethosulphate, ethoxylated alkyl amine surfactants. A surfactant, if present, is included in amounts of up to 5 total weight percent and in other embodiments from 0.05 to 1 total percent.

An inventive tire dressing composition in some embodiments includes a fragrance. A fragrance, if present is included in amounts of up to 5 total weight percent and in other embodiments from 0.1 to 3 total percent.

An inventive tire dressing composition in some embodiments includes a pigment such as iron oxide, mica, titanium dioxide, stannic oxide, metallic glitter particles such as pigmented polyethylene terephthalate, cut metalized foils such as aluminized PVC film or the like. A pigment, if present, is included in amounts of up to 1 total weight percent and in other embodiments from 0.1 to 0.5 total percent.

An inventive tire dressing composition in some embodiments includes a dye such as azo dyes, anthraquinone dyes, anthocyanins dyes, polyphenolic dyes, or combinations thereof. A dye, if present, is included in amounts of up to 1 total weight percent and in other embodiments from 0.1 to 0.5 total percent.

The components of an inventive tire dressing composition are solvated to dissolve in a solvent to yield a clear, colorless solution with the proviso that pigment is dispersed and absent a dye intended to impart a color. The solvent of the present invention is petroleum distillates with the Kauri-Butanol values range from 20 to 40 as measured by ASTM D1133 Test Method. As used herein, petroleum distillates include hydrocarbon solvents, aliphatic solvents, white oils, hydrotreated solvents, straight distillate solvents, mineral spirits, kerosene, white spirits, naphtha, and Stoddard solvents. The solvent constituting the remainder of the formulation. Typical amounts of solvent are from 10 to 80 total weight percent.

In some embodiments, hydrotreated light paraffinic distillates are present as a co-solvent. As used herein, hydrotreated light paraffinic distillates are defined as complex combination of hydrocarbons obtained by treating a petroleum fraction with hydrogen in the presence of a catalyst that contains hydrocarbons having carbon numbers predominantly in the range of $C_{15}$-$C_{30}$ with a viscosity of less than 19 centiStokes (cSt) at 40° C. with saturated hydrocarbons being a major constituent thereof. Hydrotreated light paraffinic distillates, if present, are included in amounts of up to 10 total weight percent and in other embodiments from 3 to 8 total percent.

An inventive tire dressing composition is readily applied by a vehicle owner through resort to a convention trigger spray application, propellant aerosol, or a sponge or cloth for wipe application onto the tire surface.

An inventive tire dressing composition has a fully formulated viscosity of between 5 and 400 cSt, as measured at room temperature.

Typical and preferred compositions according to the present invention are provided in Table 1.

TABLE 1

Inventive Thickened Tire Dressing Composition
(amounts in total weight)

| Ingredient | Typical | Preferred, if present |
|---|---|---|
| Polybutene or isobutene/butene copolymer | 10-60 | 23-60 |
| Wetting Agent | 0.05-4 | 0.1-0.7 |
| Defoamer | 0-5 | 0.05-1 |
| Fragrance | 0-1 | 0.01-0.5 |
| Surfactant | 0-5 | 0.1-3 |
| Pigment | 0-3 | 0.1-1 |
| Dye | 0-1 | 0-0.5 |
| Hydrotreated light paraffinic distillates | 0-10 | 3-8 |
| Solvent (e.g. pet. distillate) | to 100% | to 100% |

TABLE 2

Inventive Water-Based Thickened Tire Dressing Composition
(amounts in total weight)

| Ingredient | Typical | Preferred, if present |
|---|---|---|
| Polybutene or isobutene/butene copolymer | 10-40 | 15-40 |
| Wetting Agent | 0.05-4 | 0.1-0.7 |
| Defoamer | 0-5 | 0.05-1 |
| Fragrance | 0-1 | 0.01-0.5 |
| Surfactant | 0-5 | 0.1-3 |
| Pigment | 0-3 | 0.1-1 |
| Dye | 0-1 | 0-0.5 |
| Water | to 100% | to 100% |

The present invention is further detailed with respect to the following nonlimiting examples that are provided to further illustrate the preparation of inventive compositions and certain attributes associated with the resulting coatings on tire surfaces.

EXAMPLES

Example 1

The following compositions were determined to provide compositions that form a durable high gloss water repellant coating on a tire that is resistant to water and detergent exposure with an as applied gloss of up to 230 Gloss Units. The fully solvated compositions are clear solutions and provided with an artificial odor from the fragrance.

Inventive Composition 1

| Ingredient | Weight Percent (%) |
|---|---|
| Petroleum Distillates | 64.60 |
| Polybutene | 35.00 |
| Wetting Agent | 0.20 |
| Polysiloxane Defoamer | 0.10 |
| Fragrance | 0.10 |

Inventive Composition 2

| Ingredient | Weight Percent (%) |
|---|---|
| Petroleum Distillates | 69.60 |
| Polyisobutene | 30.00 |
| Wetting Agent | 0.20 |
| Polysiloxane Defoamer | 0.10 |
| Fragrance | 0.10 |

Inventive Composition 3

| Ingredient | Weight Percent (%) |
|---|---|
| Petroleum Distillates | 71.60 |
| Isobutene/butene copolymer | 28.00 |
| Wetting Agent | 0.20 |
| Polysiloxane Defoamer | 0.10 |
| Fragrance | 0.10 |

Inventive Composition 4

| Ingredient | Weight Percent (%) |
|---|---|
| Petroleum Distillates | 69.10 |
| Hydrotreated light paraffinic distillates | 5.00 |
| Polybutene | 25.00 |
| Wetting Agent | 0.70 |
| Polysiloxane Defoamer | 0.10 |
| Fragrance | 0.10 |

Inventive Composition 5

| Ingredient | Weight Percent (%) |
|---|---|
| Petroleum Distillates | 64.70 |
| Polybutene | 35.00 |
| Wetting Agent | 0.20 |
| Fragrance | 0.10 |

Inventive Composition 6

| Ingredient | Weight Percent (%) |
|---|---|
| Water | 69.70 |
| Polybutene | 25.00 |
| Surfactant | 5.00 |
| Wetting Agent | 0.20 |
| Fragrance | 0.10 |

Example 2

The flash points of the inventive oil based compositions 1-5 are between 70 and 150° C. These compositions 1-6 have specific gravities as measured at 20° C. of between 0.80 to 1.00. Using TRICOR systems model 806H hand-held surface analysis system, a tire gloss calibration was performed on all tires of a vehicle. Baseline gloss values for each of the tires were measured four times for the vehicle in TRICOR gloss units. For the 40 measurements of gloss used as a baseline for each vehicle, statistics were generated indicating an average pretreatment gloss of 14±4.

The inventive compositions 1-6 as applied all have a shine up to 230 gloss units.

4 weeks thereafter, the inventive compositions 1-6 all have a shine estimated to be greater than 110 Gloss Units.

Patents and publications mention the specification are indicative of the levels of those skilled in the art to which the invention pertains. These patents and publications are incorporated herein by reference to the same extent as if each individual patent or publication was specifically and individually incorporated herein by reference.

The forgoing description is illustrative of particular embodiments of the invention, but is not meant to be a limitation upon the practice thereof. The following claims, including all equivalents thereof are intended to define the scope of the invention.

The invention claimed is:

1. A tire dressing composition comprising:
   a polybutene or isobutene/butene copolymer;
   a wetting agent;
   hydrotreated light paraffinic distillates with a viscosity of less than 19 centiStokes (cSt) at 40° C.; and
   petroleum distillates with a Kauri-Butanol value range from 20 to 40 in which said polybutene or isobutene/butene copolymer and said wetting agent form a clear solution, said petroleum distillates present from 45 to 90 total weight percent, and the composition having an overall viscosity that renders the composition self-levelling.

2. The tire dressing composition of claim 1 wherein said hydrotreated light paraffinic distillates are present from 0.1 to 10 total weight percent of the composition.

3. The tire dressing composition of claim 1 wherein said polybutene or isobutene/butene copolymer is present from 10 to 40 total weight percent of the composition.

4. The tire dressing composition of claim 1 further comprising a defoamer.

5. The tire dressing composition of claim 4 wherein said defoamer is a polysiloxane.

6. The tire dressing composition of claim 1 wherein said wetting agent is present from 0.05 to 4 total weight percent of the composition.

7. The tire dressing composition of claim 1 wherein said polybutene or isobutene/butene copolymer has formula of least one of:

, or

, or

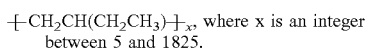, where x is an integer between 5 and 1825.

8. The tire dressing composition of claim 1 wherein said polybutene or isobutene/butene copolymer has a number average molecular weight of between 180 and 10,000.

9. The tire dressing composition of claim 1 wherein the wetting agent is a non-ionic polymeric fluorochemical surfactant, a fluoroaliphatic polymeric ester in a hydrocarbon solution, a polyfluoroalkyl betaine amphoteric surfactant, or a combination thereof.

10. A tire comprising:
    a coating formed of dried composition of claim 1;
    said coating being on a surface of the tire and having a shine of up to 230 gloss units.

11. The tire of claim 10 the shine is greater than 110 gloss units four weeks after being dried on the surface.

12. A water-based tire dressing composition consisting of:
    a polybutene or isobutene/butene copolymer present in an oil-in-water microemulsion;
    water present from 42 to 89.5 total weight percent;
    a surfactant comprising one of nonionic ethoxylated fluorinated surfactants, polyether modified polydimethylsiloxane, polyether modified polymethylalkylsiloxane, aralkyl modified polymethylalkylsiloxane, polyester modified hydroxyl functional polydimethylsiloxane, acryl functional polyester modified polydimethylsiloxane, polyether polyester modified hydroxyl functional polydimethylsiloxane, solution of a fluoro modified polyacrylate, polymeric fluorinated, ethoxylated alcohol, ethoxylated fatty acid, sorbitan ester, ethoxylated castor oils, alkyl polysaccharides, sorbitan monostearate, sorbitan monolaurate, sorbitan oleate, polyoxyethylene sorbitan, polyoxyethylene sorbitan fatty acid ester, polyoxyethylene sorbitan monooleate surfactants; or anionic phosphonated fluorinated, phosphate ester, aliphatic phosphate ester; or cationic ethoxylated fatty ammonium ethosulphate, ethoxylated alkyl amine surfactants;
    a wetting agent of an amphoteric polyfluoroalkyl betain surfactant, nonionic polymeric fluorinated surfactants, anionic phosphonated fluorinated surfactants, nonionic ethoxylated fluorinated surfactants, or a combination thereof; and
    optionally, one or more of a thickener, a fragrance, a dye, or a defoamer;
    where the composition has an overall viscosity that renders the composition self-levelling.

13. The tire dressing composition of claim 12 wherein said polybutene or isobutene/butene copolymer is present from 10 to 40 total weight percent of the composition.

14. The tire dressing composition of claim 12 said wetting agent is present from 0.05 to 4 total weight percent of the composition.

15. The tire dressing composition of claim 12 wherein said polybutene or isobutene/butene copolymer has formula of least one of:

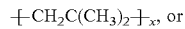, or

, or

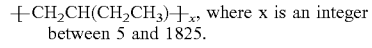, where x is an integer between 5 and 1825.

16. The tire dressing composition of claim 12 wherein said polybutene or isobutene/butene copolymer has a number average molecular weight of between 180 and 10,000.

* * * * *